US007609431B2

(12) United States Patent
Iijima

(10) Patent No.: US 7,609,431 B2
(45) Date of Patent: Oct. 27, 2009

(54) LIGHT SCANNING DEVICE AND IMAGE FORMING APPARATUS

(75) Inventor: Kiichiro Iijima, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/292,611

(22) Filed: Nov. 21, 2008

(65) Prior Publication Data

US 2009/0080045 A1 Mar. 26, 2009

Related U.S. Application Data

(62) Division of application No. 11/442,205, filed on May 30, 2006, now Pat. No. 7,474,450.

(30) Foreign Application Priority Data

Jan. 17, 2006 (JP) ............................ 2006-008610

(51) Int. Cl.
*G02B 26/08* (2006.01)

(52) U.S. Cl. ..................... 359/212.1; 359/871; 347/225

(58) Field of Classification Search ....................... None
See application file for complete search history.

(56) References Cited

U.S. PATENT DOCUMENTS

| | | | | |
|---|---|---|---|---|
| 4,453,170 A * | 6/1984 | Arao | .......................... | 347/258 |
| 7,379,222 B2 * | 5/2008 | Ushio | ...................... | 359/212.1 |
| 2002/0001408 A1 * | 1/2002 | Takase et al. | ............... | 382/162 |
| 2004/0212888 A1 | 10/2004 | Takata | | |

FOREIGN PATENT DOCUMENTS

| | | |
|---|---|---|
| JP | A-9-54265 | 2/1997 |
| JP | 10-221627 | 8/1998 |
| JP | A-2002-277785 | 9/2002 |

* cited by examiner

*Primary Examiner*—James Phan
(74) *Attorney, Agent, or Firm*—Morgan, Lewis & Bockius LLP

(57) ABSTRACT

A light scanning device which exposes a photoconductor of an image forming apparatus, includes: a light emitting unit which emits a light; a mirror which reflects a light emitted by the light emitting unit in a direction toward the photoconductor; an obtaining unit which obtains data on a speed of an image formation; and a mirror support unit which has at least one contact member provided so that it can be brought into contact with or be detached from the mirror, and which changes at least one of a position and a number of contact members contacting the mirror on the basis of data obtained by the obtaining unit.

9 Claims, 5 Drawing Sheets

LIGHT SCANNING DEVICE AND IMAGE FORMING APPARATUS

This application is a Divisional of U.S. patent application Ser. No. 11/442,205, filed May 30, 2006 now U.S. Pat. No. 7,474,450, and claims the benefit of the Japanese Patent Application No. 2006-8610 filed on Jan. 17, 2006, both of which are hereby incorporated by reference in their entirety.

BACKGROUND OF THE INVENTION

1. Technical Field

The present invention relates to a technique for preventing image degradation caused by a vibration of an image forming apparatus.

2. Related Art

Objects have a natural frequency which is determined by their material and shape, and when a vibration having the same frequency as the natural frequency of an object is imparted to that object, it vibrates much more strongly (namely, the object resonates). In an image forming apparatus such as a printer, where a vibration is caused by operation of a motor which drives components used for image formation, some members can be caused to resonate due to the driving of the motor. If the member is a reflecting member which reflects a laser beam for exposure (e.g. a mirror), an image formed on a photoconductor is blurred due to resonation of the member, and cyclical band-like color density irregularities, which are referred to as bandings, are generated. Accordingly, it is necessary to prevent resonance of a reflecting member.

SUMMARY

The present invention provides a light scanning device which exposes a photoconductor of an image forming apparatus, including: a light emitting unit which emits a light; a mirror which reflects a light emitted by the light emitting unit in a direction toward the photoconductor; an obtaining unit which obtains data on a speed of an image formation; and a mirror support unit which has a contact member provided so that it can be brought into contact with or be detached from the mirror, and which changes at least one of a position and a number of contact members contacting the mirror on the basis of data obtained by the obtaining unit.

BRIEF DESCRIPTION OF THE DRAWINGS

Exemplary embodiments of the present invention will now be described in detail with reference to the following figures, wherein.

DETAILED DESCRIPTION

Exemplary embodiments of the present invention will be described with reference to the drawings below. In the exemplary embodiments, for the purpose of explanation, an image forming apparatus is an electrophotographic printer; however, the present invention can be realized using other apparatus.

First Exemplary Embodiment

Figure 1:
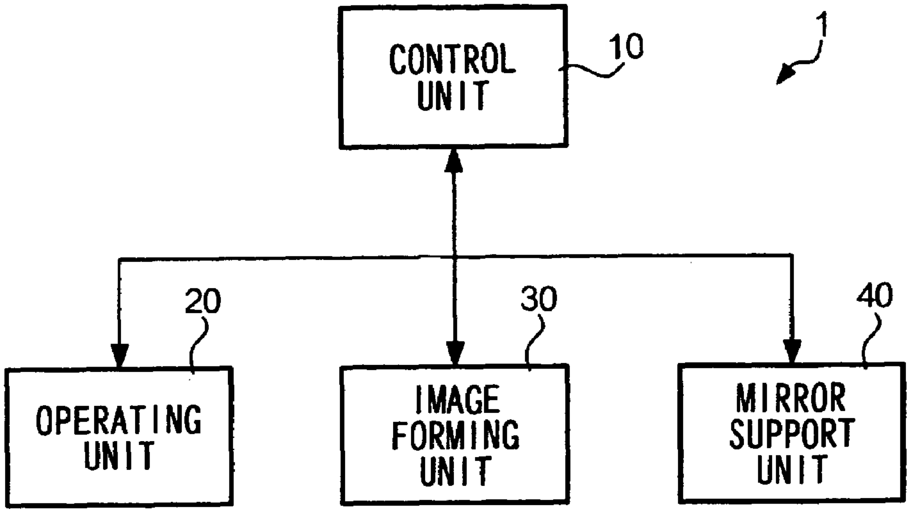
FIG. 1 is a functional block diagram showing the configuration of functions of an image forming apparatus according to the first exemplary embodiment of the present invention.

FIG. 1 is a functional block diagram showing the configuration of functions of image forming apparatus 1 according to the first exemplary embodiment of the present invention. Image forming apparatus 1 includes: control unit 10; operating unit 20; image forming unit 30; and mirror support unit 40. Control unit 10 includes: a CPU (Central Processing Unit); a ROM (Read Only Memory); a RAM (Random Access Memory); a HDD (Hard Disk Drive); and an input-output interface. The CPU has a function of controlling operations of the entire image forming apparatus 1 through the execution of programs stored in the HDD and the ROM. Control unit 10 has a function of receiving image data from: an external device such as a scanner or a personal computer via the input-output interface, and calculating light exposure from the received image data.

Operating unit 20 is an input device with a touch panel, and has a function of displaying a variety of information relevant to formation of an image and receiving an instruction from a user. A user inputs via operating unit 20 an instruction to start an image formation, a mode of an image formation, etc. Image forming apparatus according to this exemplary embodiment has, as an image formation mode, a "high quality mode" and a "high speed mode". The "high quality mode" is a mode for forming a high-definition image, in which an image formation is performed at relatively low speed. The "high speed mode" is a mode for forming an image in a short time, in which an image formation is performed at higher speed than in the "high quality mode".

Figure 2:
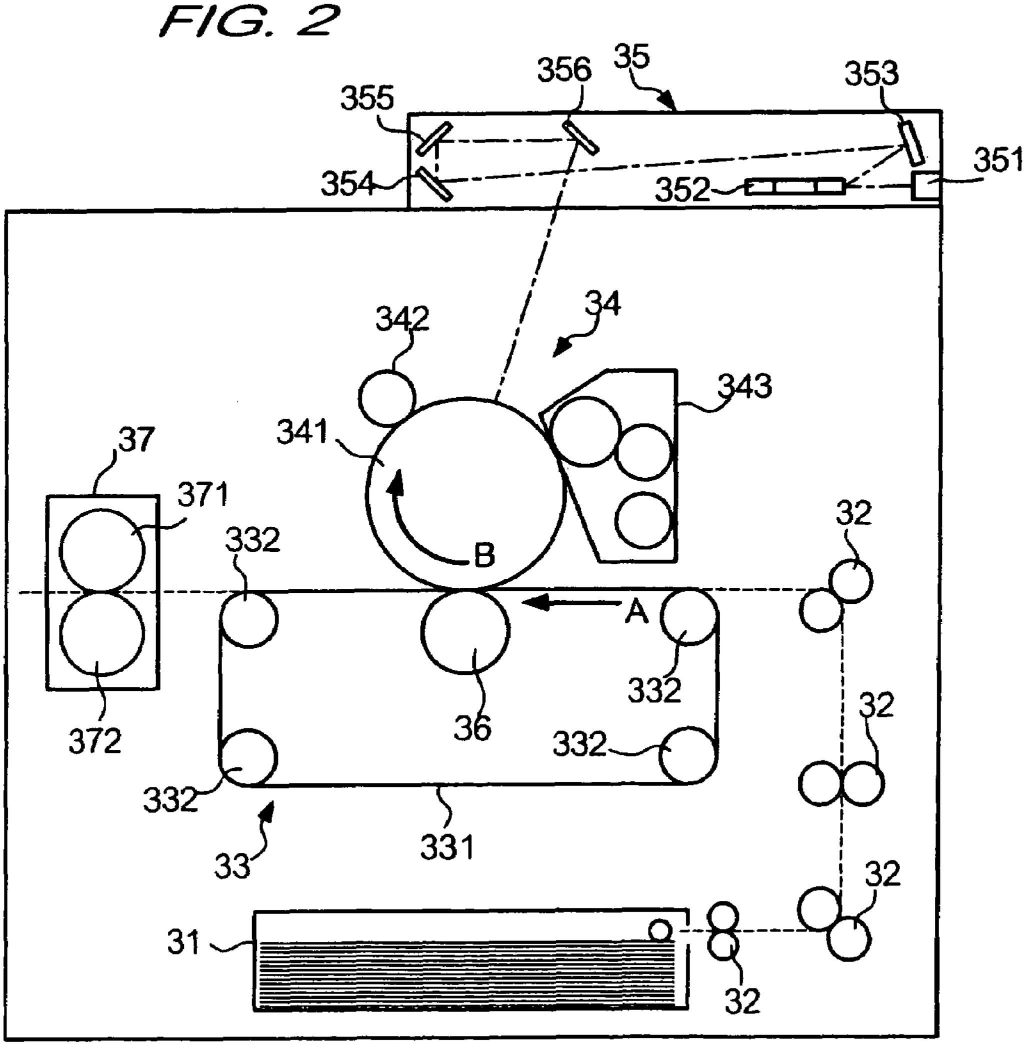
FIG. 2 is a diagram showing the configuration of an image forming unit of the image forming apparatus.

Image forming unit 30 has a function of forming, on the basis of an instruction from a user inputted via operating unit 20, and image data received by control unit 10, a toner image represented by the image data on a sheet. The specific configuration of image forming unit 30 is shown in FIG. 2. As shown in the drawing, image forming unit 30 includes: sheet tray 31; plural conveyance rollers 32; sheet conveyance unit 33; drum unit 34; ROS (Raster Output Scanner) unit 35; transfer roller 36; and fusing unit 37. The dashed line in the drawing indicates the path by which a sheet is conveyed.

Sheet tray 31 houses plural sheets, and feeds a sheet in accordance with a toner image formation process in the drum unit 34. Conveyance roller 32 is a driving member rotated by a motor (not shown), and conveys a sheet fed from sheet tray 31. Sheet conveyance unit 33 includes sheet conveyance belt 331 which is a ring-shaped belt, and plural conveyance rollers 332 supporting sheet conveyance belt 331, and conveys a sheet by moving sheet conveyance belt 331 in the direction of an arrow A in the drawing. At lease one of the plural conveyance rollers 332 functions as a driving member, and is rotated by a motor (not shown), and moves sheet conveyance belt 331.

Drum unit 34 includes: photosensitive drum 341; charger 342; and developing unit 343. Photosensitive drum 341 is an image holder having a charge generation layer and a charge transport layer, and is rotated by a motor (not shown) in the direction of an arrow B in the drawing. Charger 342 includes a charging roller, and charges the surface of photosensitive drum 341 uniformly. In the charged surface of photosensitive drum 341, an electrostatic latent image is formed by ROS unit 35. Developing unit 343 houses toner of predetermined colors, and generates a predetermined electrical potential difference (developing bias) between itself and the surface of photosensitive drum 341. Toner is caused by the electrical potential difference to attach to an electrostatic latent image formed on the surface of photosensitive drum 341; consequently, a toner image is formed on the surface of photosensitive drum 341. Transfer roller 36 generates a predetermined electrical potential difference (transfer bias) between itself and the surface of photosensitive drum 341 at a position where sheet conveyance belt 331 faces photosensitive drum 341. A toner image is transferred by the electrical potential difference on a sheet conveyed by sheet conveyance belt 331. Fusing unit 37 includes heating roller 371 and pressure roller 372, and by means of the rollers heats and pressurizes a sheet for fixation of a toner image transferred on the sheet. At least one of heating roller 371 and pressure roller 372 is a driving member rotated by a motor (not shown).

ROS unit 35 is a light scanning device which is detachable from image forming apparatus 1. ROS unit 35 includes: light source 351; polygon mirror 352; and mirrors 353, 354, 355, and 356. Light source 351 is a surface emitting laser diode, and emits a beam whose intensity changes according to tones of image data, to polygon mirror 352. Polygon mirror 352 is a mirror having plural reflecting surfaces. Polygon mirror is rotated by a motor (not shown), and reflects a beam in the direction of mirror 353 at one of the reflecting surfaces. Mirrors 353, 354, 355, and 356 are reflecting members extending in a direction perpendicular to the page surface of FIG. 2, and reflect an incoming beam to lead the beam to a predetermined position on photosensitive drum 341.

As described above, image forming unit 30 includes plural driving members rotating according to an image forming process, such as conveyance roller 32, photosensitive drum 341, and polygon mirror 352, which are rotated by a motor (not shown). The driving members may be rotated by different motors, or by a single motor through a transmission mechanism such as gears. Also, the driving members are rotated at a speed according to the desired mode of an image formation. In the "high speed mode" the driving members are rotated at a higher speed than in the "high quality mode". The speed of an image formation indicates a time period required to form an image on a sheet.

Mirror support unit 40 has a function of preventing resonance of mirrors 353, 354, 355, and 356 by changing the number of members contacting each mirror. In particular, mirror support unit 40 has a function of changing the frequency that causes each mirror to resonate (hereinafter, referred to as "resonance frequency") or a frequency mode of each mirror according to the speed of an image formation so that the resonance frequency, of each mirror does not coincide with the frequencies of vibrations generated in driving members in association with an image formation.

Figure 3:
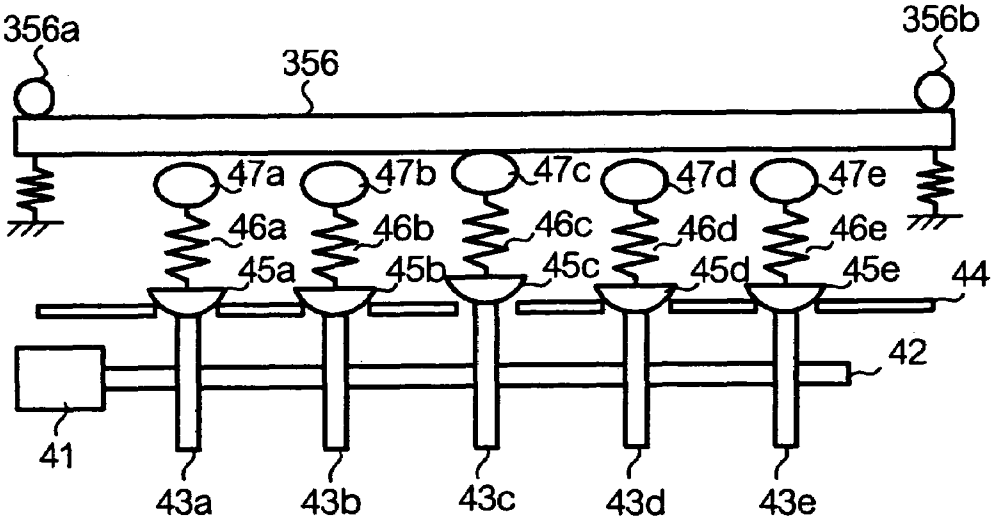
FIG. 3 is a diagram showing the configuration of a mirror support unit of the image forming apparatus.

FIG. 3 is a diagram showing the specification of mirror support unit 40. Please note that although the drawing shows the specification of only mirror 356 and its surroundings, the same specification is provided in mirrors 353, 354, and 356 which constitute mirror support unit 40. Mirror 356 is held by holding members 356*a* and 356*b* at both ends, and the position is fixed.

As shown in FIG. 3, mirror support unit 40 includes: motor 41 shaft 42; cams 43*a*, 43*b*, 43*c*, 43*d*, and 43*e*; detachment prevention plate 44; detachment prevention members 45*a*, 45*b*, 45*c*, 45*d*, and 45*e*; force applying springs 46*a*, 46*b*, 46*c*, 46*d*, and 46*e*; and elastic members 47*a*, 47*b*, 47*c*, 47*d*, and 47*e*. Motor 41 is a stepping motor rotating by 60 degrees at a time. Shaft 42 transfers a rotation of motor 41 to cams 43*a* to 43*e*. Cams 43*a* to 43*e* are oval members with cutaway portions on their peripheral edges, and shaft 42 runs through cams 43*a* to 43*e*, approximately at their center.

Figure 4:
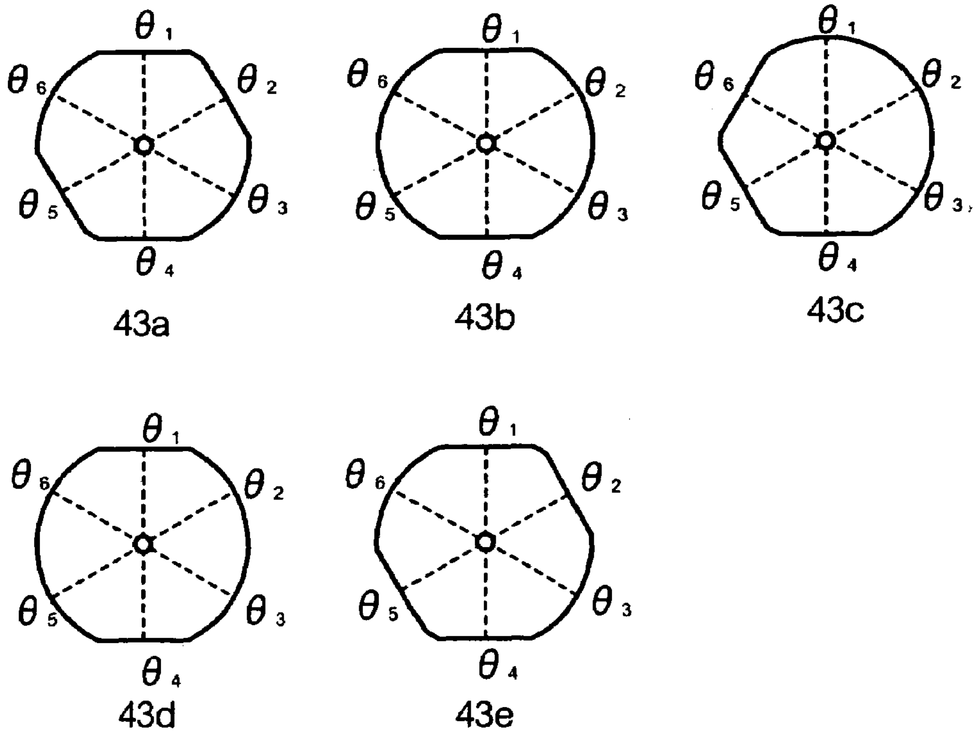
FIG. 4 is a diagram showing the configuration of cams of the image forming apparatus.

FIG. 4 is a diagram showing cams 43*a* to 43*e* viewed along shaft 42. In the drawing, the top of cams 43*a* to 43*e* is defined as the starting point or $\theta_1$. Angles being 60 degrees, 120 degrees, 180 degrees, 240 degrees, 300 degrees away from the angle $\theta_1$ clockwise are defined as $\theta_2$, $\theta_3$, $\theta_4$, $\theta_5$, $\theta_6$, respectively.

As shown in FIG. 4, cams 43*a* and 43*e* have cutaway portions at angles $\theta_1$, $\theta_2$, $\theta_4$, and $\theta_5$. Cam 43*c* has cutaway portions at angles $\theta_4$, $\theta_5$, and $\theta_6$. Cams 43*b* and 43*d* have cutaway portions at angles $\theta_1$ and $\theta_6$. Since shaft 42, which is the axis of rotation, runs through each cam at a position which would be the center of the cam if the cam were circular, and no portions were cut away, a radius at an angle with a cutaway portion is shorter than that at an angle without a cutaway portion.

Detachment prevention plate 44 is a plate-shaped member which is similar in size to mirror 356, and which has holes 44*a* to 44*e*, which correspond to detachment prevention members 45*a* to 45*e* respectively. The diameter of holes 44*a* to 44*e* is smaller than that of detachment prevention members 45*a* to 45*e*; therefore, detachment prevention members 45*a* to 45*e* do not fall through holes 44*a* to 44*e*. Detachment prevention members 45*a* to 45*e* are members moving up and down according to rotation of cams 43*a* to 43*e*, and move down when contacting with cams 43*a* to 43*e* at a cutout section. Force applying springs 46*a* to 46*e* apply force to elastic members 47*a* to 47*e* in a direction toward mirror 356. Elastic members 47*a* to 47*e* are members contacting the other side of the reflective surface of mirror 356, and are an elastic body such as rubber. Elastic members 47*a* to 47*a* have elasticity to the extent that they do not deform mirror 356 even if pushed by support springs 46*a* to 46*e*. Force applying springs 46*a* to 46*e* have length and elasticity to the extent that elastic members 47*a* to 47*e* are detached from mirror 356 when detachment prevention members 45*a* to 45*e* move down.

With the configuration described above, control unit 10 of image forming apparatus 1 adjusts the rotation angle of cams 43*a* to 43*e* according to a selected image formation mode. In particular, control unit 10 changes the number of elastic members 47*a* to 47*e* contacting mirrors 353 to 356 so that the frequency of vibrations generated in driving members causes none of the mirrors to resonate. Below is a description of an example of a specific operation of mirror support unit 40.

Figure 5A:
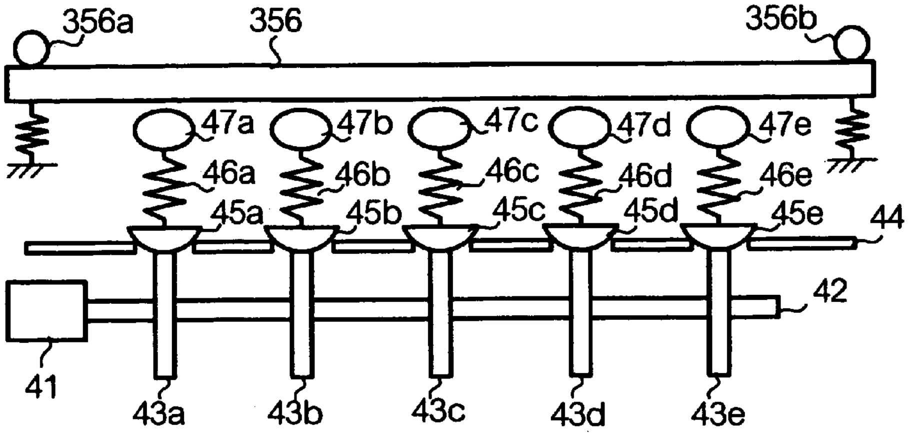
FIGS. 5A and 5B are diagrams illustrating situations of the mirror support unit of the image forming apparatus.
Figure 5B:
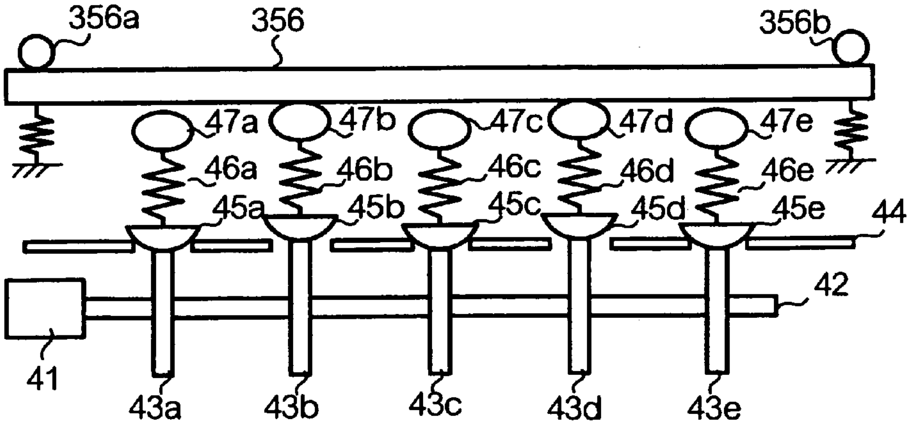

FIGS. 5A and 5B are diagrams showing two situations of mirror support unit 40. FIG. 5A shows a situation A where cams 43*a* to 43*e* have been rotated by 180 degrees from $\theta_1$ clockwise; consequently, the cams contact detachment prevention members 45*a* to 45*e* at $\theta_4$. FIG. 5B shows a situation B where cams 43*a* to 43*e* have been rotated by 240 degrees from $\theta_1$ clockwise; consequently, the cams contact detachment prevention members 45*a* to 45*e* at $\theta_5$. As shown in the drawings, when cams 43*a* to 43*e* in the situation A are rotated by 60 degrees clockwise, the number of elastic members contacting mirror 356 increases from zero to two (47*b* and 47*d*). Consequently, the natural frequency or the resonance frequency of mirror 356 changes.

Figure 6:
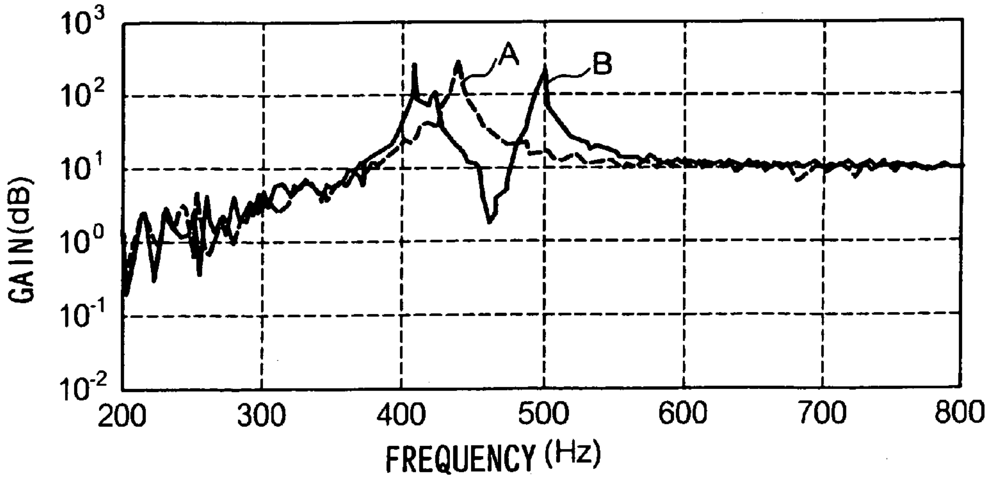
FIG. 6 is a diagram showing the degree of vibration of the mirror support unit in the situations illustrated in FIGS. 5A and 5B.

FIG. 6 is a diagram showing the degree of vibration of the mirror 356 in the situations A and B to which vibrations with different frequencies are applied. As shown in the drawing, in the situation A, the peak of a vibration (namely resonance) appears at approximately 430 Hz, whereas in the situation B, the peak of a vibration appears at approximately 500 Hz. Namely, the resonance frequency of mirror 356 is different in the situation A to the situation B.

Generally, as the number of elastic members contacting a mirror increases, the resonance frequency of the mirror becomes higher. Also, even if the number of elastic members contacting a mirror is identical, the resonance frequency of the mirror changes depending on positions where the elastic members contact the mirror.

As described above, changing the number or positions of elastic members contacting the mirror can change its resonance frequency. Accordingly, resonance of a mirror can be prevented by determining the number and positions of elastic members contacting the mirror so that the resonance frequency of the mirror in each image formation mode does not coincide with frequencies of driving members. It is to be noted that frequencies of driving members in each image formation mode and resonance frequencies of a mirror differentiated by the number and positions of elastic members contacting the mirror are obtained in advance.

It is to be noted that in this exemplary embodiment a driving member, whose frequency is to be considered in view of the resonance frequency of a mirror, may be any of the driving members described above. Also, such a driving member may be plural. In fact, since it is not realistic to consider the frequencies of all driving members, it is only necessary to consider driving members having a significant effect on a mirror, e.g. driving members near the mirror and driving members causing a strong vibration.

Figure 7:
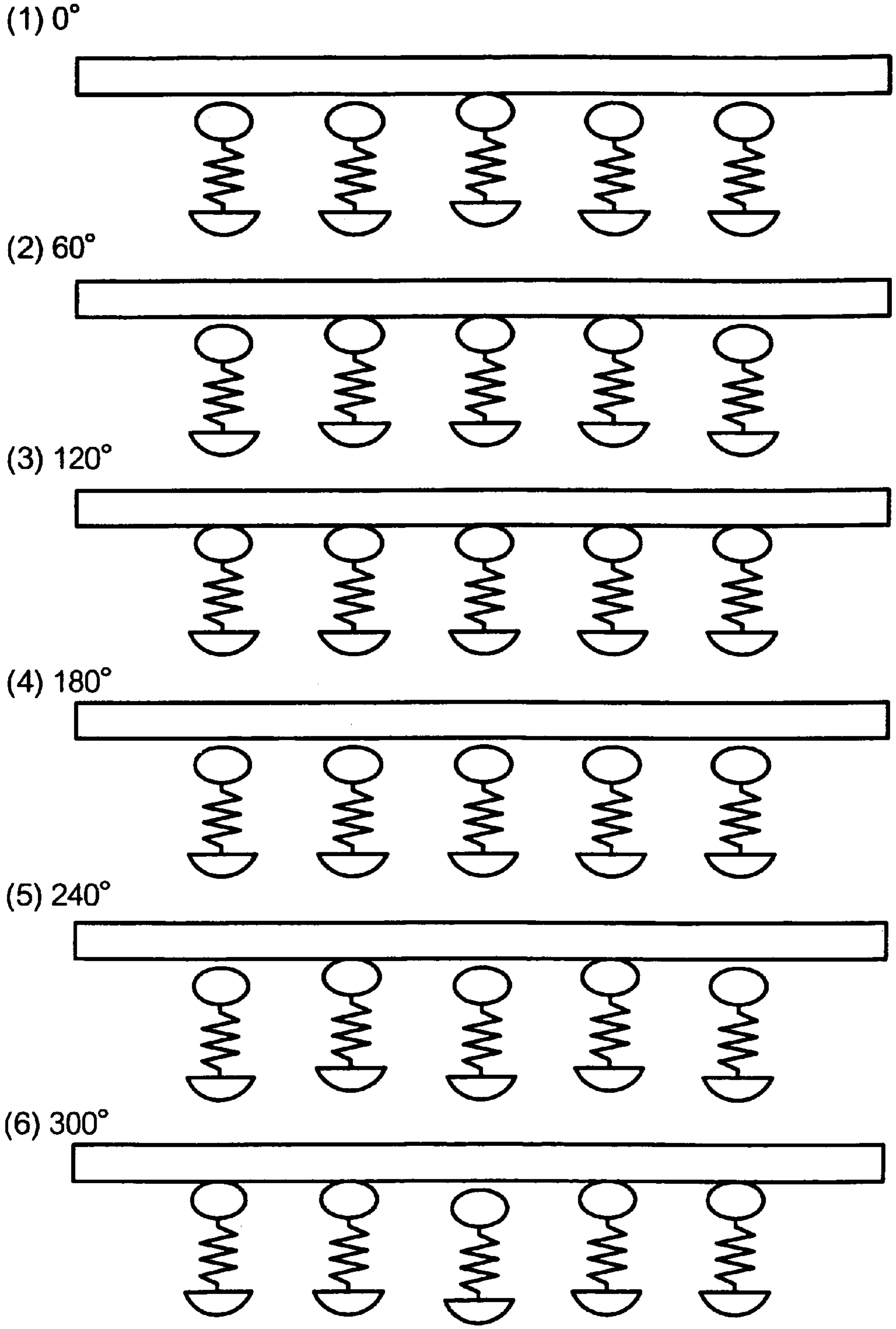
FIG. 7 is a diagram showing other possible situations of the mirror support unit.

Mirror support unit 40 may be in situations other than the above situations A and B. In particular, as shown in FIG. 7, mirror support unit 40 may be in six situations where the rotation angle from $\theta_1$ is 0 degree, 60 degrees, 120 degrees, 180 degrees, 240 degrees, and 300 degrees. The situation where the rotation angle is 180 degrees is the situation A, and the situation where the rotation angle is 240 degrees is the situation B.

The speed of an image formation in image forming apparatus 1 may differ from the above two modes.

Second Exemplary Embodiment

The second exemplary embodiment of the present invention will now be described. The present embodiment is a modification of the first exemplary embodiment, and shares its substantial configuration with the first exemplary embodiment. Therefore, characteristic configurations of this exemplary embodiment will be described, and descriptions of identical configurations with those of the first exemplary embodiment will be omitted.

Figure 8:
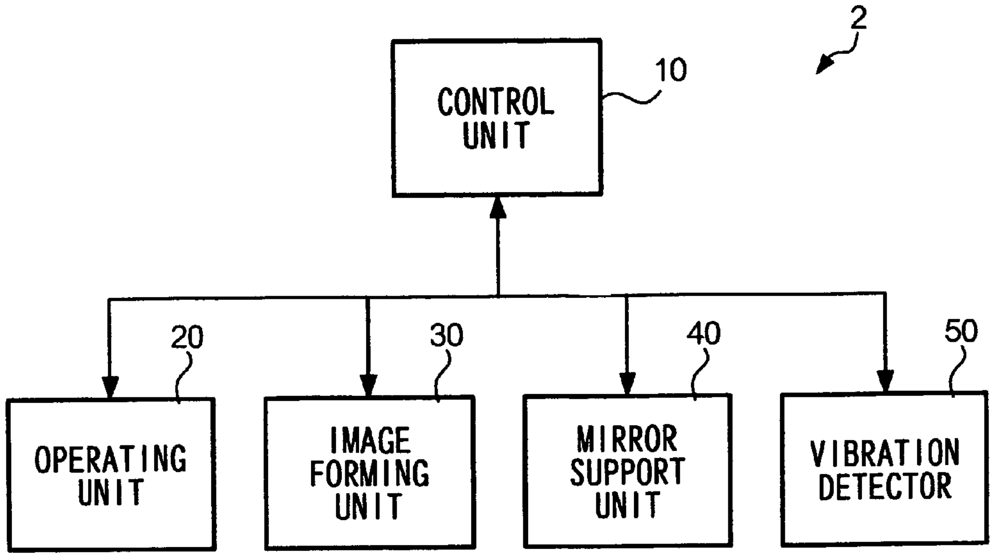
FIG. 8 is a functional block diagram showing the configuration of functions of an image forming apparatus according to the second exemplary embodiment of the present invention.

FIG. 8 is a functional block diagram showing the configuration of functions of an image forming apparatus 2 according to this exemplary embodiment. As shown in the drawing, image forming apparatus 2 includes: control unit 10; operating unit 20; image forming unit 30; mirror support unit 40; and vibration detector 50. Image forming apparatus 2 is different from image forming apparatus 1 in that it includes vibration detector 50.

Vibration detector 50 includes a sensor (e.g. acceleration pickup) for detecting a vibration in ROS unit 35 or mirrors 353 to 356, and has a function of measuring the frequency of a vibration applied to the units. Also, vibration detector 50 has a function of providing a value detected by the sensor to control unit 10. The sensor may be provided at the case of ROS unit 35, or may be attached at mirrors 353 to 356.

Image forming apparatus 2 adjusts the rotation angle of cams 43*a* to 43*e* according to a value detected by vibration detector 50, in contrast to image forming apparatus 1 which adjusts the rotation angle of cams 43*a* to 43*e* according to an image formation mode. In particular, image forming apparatus 2, if a frequency detected by vibration detector 50 is close to the current resonance frequency of image forming apparatus 2, adjusts the rotation angle of cams 43*a* to 43*e* to cause the resonance frequency to change.

According to image forming apparatus 2, a vibration is detected directly in contrast to the first exemplary embodiment. Accordingly, it is possible to prevent resonance even in a situation where the speed of an image formation changes continuously. Also, since the rotation angle of cams 43*a* to 43*e* is adjusted in response to a vibration other than a vibration generating in a driving member, it is possible to prevent resonance caused by a vibration generated outside of the apparatus.

MODIFICATIONS

The present invention can be realized as an exemplary embodiment other than the exemplary embodiments described above. The exemplary embodiments can be modified as described below, and the following modifications are combinable.

In the first exemplary embodiment, since the speed of an image formation is determined by an image formation mode, the rotation angle of cams is adjusted according to an image formation mode. However, since the driving speed of a driving member is correlated with the speed of an image formation, the rotation of cams may be adjusted according to the speed of a driving member, which is measured by a sensor.

Also, in the above exemplary embodiments, where elastic members are brought into contact with or detached from a mirror using cams, solenoid switches may be provided for elastic members, and the elastic members may be brought into contact with or detached from a mirror through on-off control of the solenoid switches. Also, in the exemplary embodiments, instead of all cams being rotated by a single motor, they may be rotated independently, by different motors.

Figure 9:
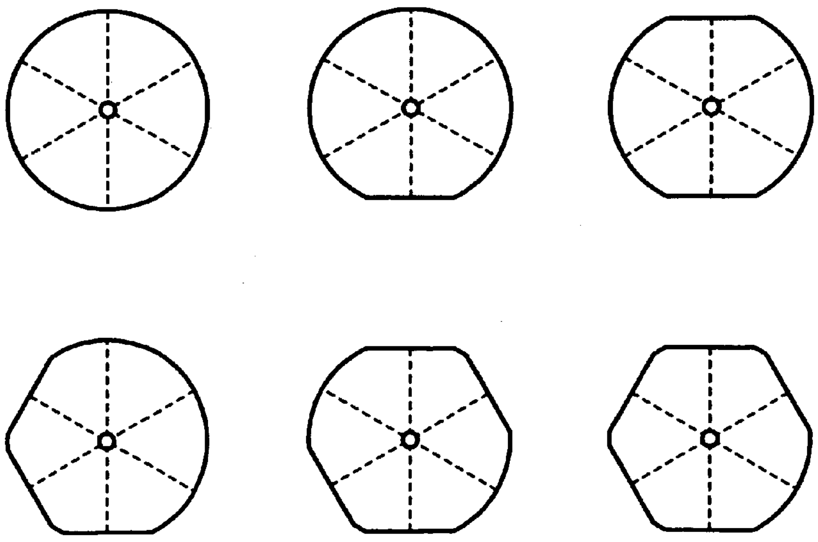
FIG. 9 is a diagram showing modifications of the shape of the cams.

Also, in the above exemplary embodiments, where five elastic members are provided, the number of elastic member provided may be more than six or less than four. Also, the interval of the rotation angle of cams may be less than 60 degrees. Also, the shape of a cam is not limited as described in FIG. 4, but may be as shown in FIG. 9. By combining such different cams, the values of the resonance frequency of a mirror can be varied.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments are chosen and described to best explain the principles of the invention and its practical applications, to thereby enable others skilled in the art to understand various embodiments of the invention and various modifications thereof, to suit a particular contemplated use. It is intended that the scope of the invention be defined by the following claims and their equivalents.

What is claimed is:

1. A light scanning device which exposes a photoconductor of an image forming apparatus, comprising:

a light emitting unit which emits a light;

a mirror which reflects a light emitted by the light emitting unit in a direction toward the photoconductor;

a detector which detects a vibration of the mirror; and a mirror support unit which has at least one contact member provided so that it can be brought into contact with or be detached from the mirror, and which changes at least one of a position and a number of contact members contacting the mirror according to a vibration detected by the detector.

2. The light scanning device according to claim 1, wherein the mirror support unit, in a case where a vibration having a predetermined frequency is detected by the detector, changes at least one of a position and a number of contact members contacting the mirror so that the mirror is not caused to resonate by the vibration.

3. The light scanning device according to claim 1, wherein the mirror support unit causes the contact member to push the mirror with a pressure that does not deform the mirror.

4. The light scanning device according to claim 1, wherein:

the mirror support unit comprises:

an approximately circular cam with a cutaway portion which contacts with the contact member, and a drive member which rotates the cam; and the mirror support unit, when detaching the contact members from the mirror, causes the cam to contact with the contact member at a cutaway portion of the cam, and when bringing the contact member into contact with the mirror, causes the cam to contact with the contact member at a position other than the cutaway portion.

5. The light scanning device according to claim 4, wherein:

the mirror support unit comprises:

another contact member, and another cam which contacts the other contact member; and the mirror support unit causes all of the cams to be rotated by the drive member.

6. The light scanning device according to claim 1, wherein the contact member comprises an elastic member.

7. The light scanning device according to claim 6, wherein the elastic member is a part of the contact member which contacts with the mirror.

8. The light scanning device according to claim 7, wherein the contact member comprises a spring which applies a force to the elastic member in a direction toward the mirror.

9. An image forming apparatus comprising a light scanning device which exposes a photoconductor of an image forming apparatus, the light scanning device comprising:

a light emitting unit which emits a light;

a mirror which reflects a light emitted by the light emitting unit in a direction toward the photoconductor;

a detector which detects a vibration of the mirror; and a mirror support unit which has at least one contact member provided so that it can be brought into contact with or be detached from the mirror, and which changes at least one of a position and a number of contact members contacting the mirror according to a vibration detected by the detector.

* * * * *